United States Patent
Araki et al.

(10) Patent No.: US 9,704,237 B2
(45) Date of Patent: Jul. 11, 2017

(54) MEASURING METHOD AND MEASURING DEVICE

(71) Applicant: Kobe Steel, Ltd., Hyogo (JP)

(72) Inventors: Kaname Araki, Kobe (JP); Eiji Takahashi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 29 days.

(21) Appl. No.: 14/433,794

(22) PCT Filed: Oct. 10, 2013

(86) PCT No.: PCT/JP2013/006062
§ 371 (c)(1),
(2) Date: Apr. 6, 2015

(87) PCT Pub. No.: WO2014/083749
PCT Pub. Date: Jun. 5, 2014

(65) Prior Publication Data
US 2015/0254829 A1   Sep. 10, 2015

(30) Foreign Application Priority Data

Nov. 29, 2012   (JP) .................................. 2012-260595

(51) Int. Cl.
*G06T 7/00* (2017.01)
*B60C 13/00* (2006.01)
(Continued)

(52) U.S. Cl.
CPC .............. *G06T 7/001* (2013.01); *B60C 13/00* (2013.01); *G01B 11/24* (2013.01);
(Continued)

(58) Field of Classification Search
None
See application file for complete search history.

(56) References Cited

U.S. PATENT DOCUMENTS 6,539,789 B1   4/2003   Kostka et al.
2005/0267807 A1*   12/2005   Bentley, III ........... G06Q 10/06
705/300

(Continued)

FOREIGN PATENT DOCUMENTS

JP   S62-232507 A   10/1987
JP   S62-232508 A   10/1987
(Continued)

OTHER PUBLICATIONS

The extended European search report issued by the European Patent Office on Apr. 15, 2016, which corresponds to European Patent Application No. 13858549.2 and is related to U.S. Appl. No. 14/433,794.

(Continued)

*Primary Examiner* — Kim Vu
*Assistant Examiner* — Nathan Bloom
(74) *Attorney, Agent, or Firm* — Studebaker & Brackett PC

(57) ABSTRACT

A measuring unit (301) acquires measurement data for a plurality of lines by repeatedly executing, on a reference tire, a measurement process to acquire measurement data for one line. A first acquisition unit (311) generates height data for one line for each of the plurality of sets of measurement data measured by the measuring unit (301), arranges the generated plurality of values of one-dimensional height data into a matrix form, generates two-dimensional height data for the measured face, and generates reference shape data. A second acquisition unit (314) acquires object one-dimensional height data from one-line shape data measured by the measuring unit (301) for the object tire. The measuring method and measuring device are characterized in that a removal unit (315) compares the object one-dimensional height data and the one-dimensional height data of the (Continued)

reference shape data at the same position in the sub-scan direction for the object one-dimensional height data, and removes, from the object one-dimensional height data, the height component of the projection.

5 Claims, 8 Drawing Sheets

(51) Int. Cl.
*G06T 7/73* (2017.01)
*G01M 17/02* (2006.01)
*G01B 11/24* (2006.01)
*G06K 9/46* (2006.01)
*G06K 9/62* (2006.01)

(52) U.S. Cl.
CPC ....... *G01B 11/2408* (2013.01); *G01M 17/027* (2013.01); *G06K 9/4604* (2013.01); *G06T 7/73* (2017.01); *G06K 9/6203* (2013.01); *G06T 2207/10004* (2013.01); *G06T 2207/30108* (2013.01)

(56) References Cited

U.S. PATENT DOCUMENTS

| | | |
|---|---|---|
| 2007/0209431 A1 | 9/2007 | Fujisawa et al. |
| 2008/0135147 A1 | 6/2008 | Chen |
| 2009/0040533 A1* | 2/2009 | Takahashi .......... G01B 11/2522 356/612 |
| 2011/0178676 A1 | 7/2011 | Chen |
| 2011/0246128 A1 | 10/2011 | Nicholson et al. |
| 2012/0242824 A1 | 9/2012 | Takahashi et al. |
| 2014/0219541 A1* | 8/2014 | Noyel ...................... G06T 5/30 382/141 |
| 2014/0270466 A1* | 9/2014 | Dam ................... G01M 17/027 382/141 |

FOREIGN PATENT DOCUMENTS

| | | |
|---|---|---|
| JP | 2004-156919 A | 6/2004 |
| JP | 2005-331274 A | 12/2005 |
| JP | 3768625 B2 | 4/2006 |
| JP | 2008-286703 A | 11/2008 |
| JP | 2010-181320 A | 8/2010 |
| JP | 2011-141260 A | 7/2011 |
| JP | 2012-513029 A | 6/2012 |
| TW | 335444 | 7/1998 |
| TW | 200824931 A | 6/2008 |

OTHER PUBLICATIONS

International Search Report; PCT/JP2013/006062; Nov. 26, 2013.
Written Opinion of the International Searching Authority; PCT/JP2013/006062; Nov. 26, 2013.

* cited by examiner (A)

(B)

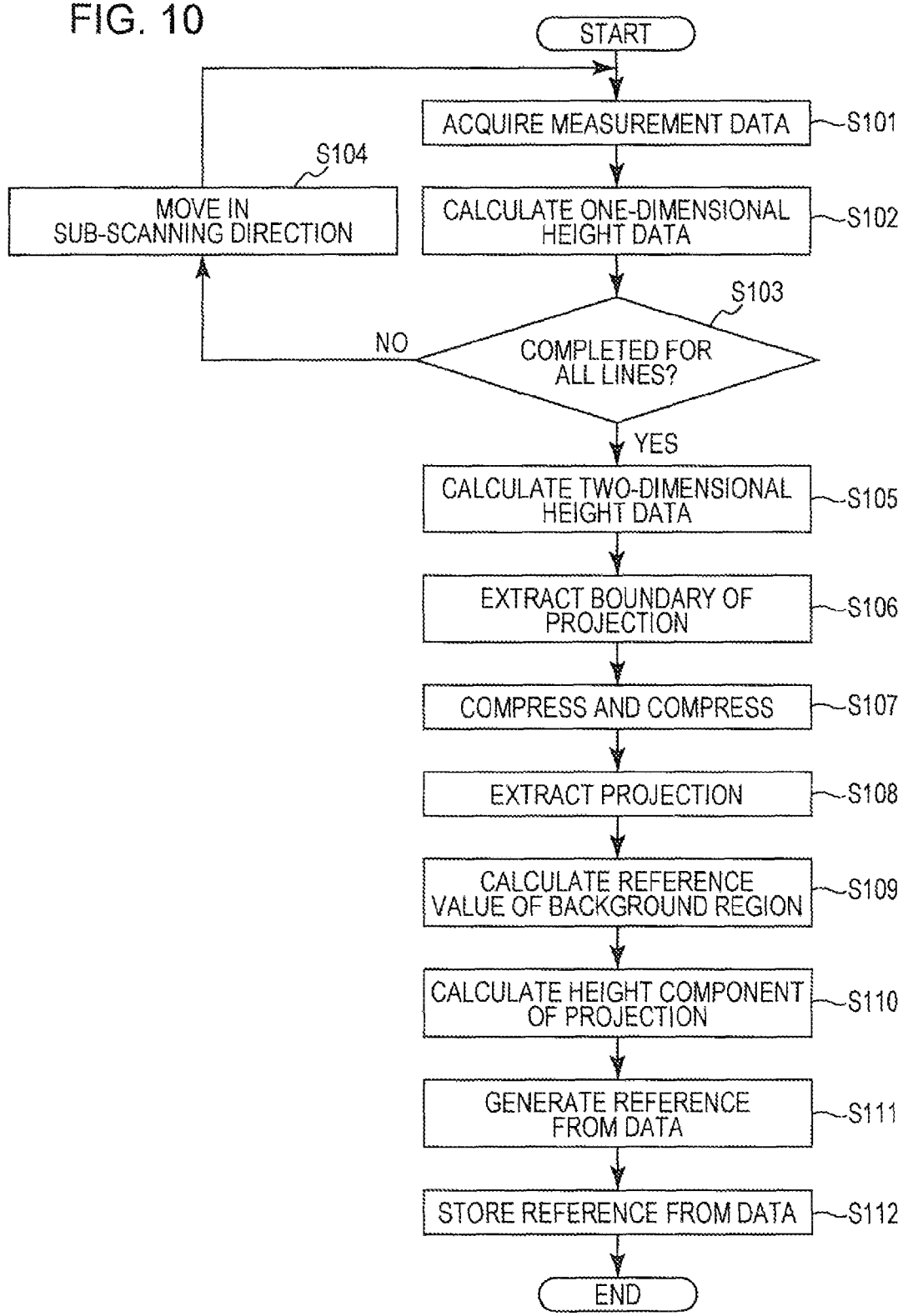

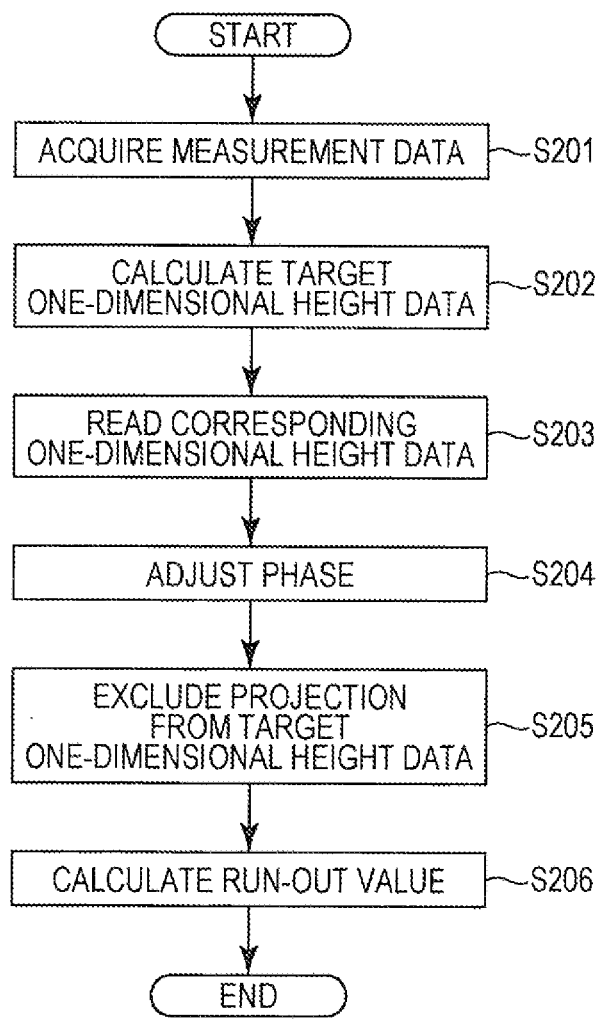

MEASURING METHOD AND MEASURING DEVICE

TECHNICAL FIELD

The present invention relates to a technique for measuring the surface form of a measurement surface, the measurement surface being the tread surface or the sidewall surface of a tire on which projections are formed.

BACKGROUND ART

Tires have a complex layered structure in which various types of materials, such as rubber, chemical fibers, and steel cords, are layered. The supporting surface (tread surface) of a tire having a complex layered structure needs to maintain the uniformity of the tire radius and to suppress undulation (run-out) on the supporting surface in order to prevent radial run-out due to variations in the tire radius. On the other hand, irregularities called bulges or indentations may occur on the sidewall surface in addition to run-out and also need to be suppressed.

Accordingly, in a tire manufacturing process, it is necessary to inspect the form of the tread surface and the sidewall surface of a tire and to evaluate the inspected form.

Therefore, in a final tire manufacturing process (in an inspection process after vulcanization of tires), measurement of run-out values of the tread surface and inspection for a defective form of the sidewall surface are specifically performed. The tread surface has grooves, and the sidewall surface has intended projections due to characters or patterns formed thereon. Recently, there has been a demand for a means to measure the form of a tire without being affected by grooves or projections.

In recent years, in a technique for measuring run-out values of a tire, attempts have been made to measure run-out values by using a laser distance sensor, a three-dimensional form measuring device, a camera, or the like and to automatically evaluate the tire from the measured run-out values.

PTL 1 discloses a form measuring device that measures the form of a tire without a need to select a measurement line even if unnecessary irregularities are present on the surface of the tire, by obtaining sample data for one line on the tire using an optical displacement meter and removing a predetermined signal pattern from the obtained sample data.

PTL 2 discloses a technique in which numeric data for one rotation of a tire is acquired by scanning the tread surface of the tire in the circumferential direction using a non-contact displacement meter, and, if the difference between numeric data at a position of interest and the median of a group of a plurality of pieces of numeric data at positions before and after the position of interest is larger than a threshold, the numeric data at the position of interest is determined to be noise.

PTL 3 discloses the following technique. The amount of displacement due to irregularities on the tire surface on two lines is measured on the sidewall surface, one of the two lines passing through a position in an intended projection, the other not passing through any position in any intended projection, and original waveforms A and B of the two lines are generated. Next, approximate curves A1 and B1 that represent the undulation components of the generated original waveforms A and B are generated, the approximate curves A1 and B1 are subtracted from the original waveforms A and B, and irregular waveforms A2 and B2 are generated respectively. Next, the irregular waveform A2 is multiplied by the irregular waveform B2, and an irregular form from which an intended pattern has been removed is calculated. Then, a defective irregularity is detected using the obtained irregular form.

PTL 4 discloses a configuration in which pieces of one-dimensional measurement data of the tire surface are arranged in a circle and converted into two-dimensional measurement data, a convex hull filter is applied to the two-dimensional measurement data, measurement data that lies on a convex hull is extracted, and the extracted measurement data is converted back to one-dimensional measurement data.

It is extremely difficult to distinguish an irregularity that indicates a defect in a tire from a projection, such as a character or a pattern, which has been intentionally formed. With measurement data for only one line, a projection which has been intentionally formed cannot be accurately excluded from measurement data, and the projection may be determined to be an irregularity that indicates a defect.

According to any of PTL 1, PTL 2, and PTL 4, only one-dimensional data is obtained, and therefore, a projection that has been intentionally formed cannot be accurately detected, which is a problem. According to PTL 3, pieces of measurement data for two lines are obtained; however, the pieces of measurement data for the two lines lie spatially apart from each other. Therefore, a projection that has been intentionally formed cannot be accurately detected, which is also a problem.

Recently, a technique for acquiring measurement data for one line at a time by using a line laser has been developed. However, a system using a line laser is very expensive compared to a point-laser-type system, which is a problem.

CITATION LIST

Patent Literature

PTL 1; Japanese Unexamined Patent Application Publication No. 62-232507

PTL 2: Japanese Unexamined Patent Application Publication No. 2008-286703

PTL 3: Japanese Patent No. 3768625

PTL 4: Japanese Unexamined Patent Application Publication (Translation of PCT Application) No. 2012-513029

SUMMARY OF INVENTION

An object of the present invention is to provide a technique for accurately measuring the surface form of a tire by accurately extracting projections that have been intentionally formed on the tire without using a line laser so as to eliminate effects of the projections on the tire.

A measuring method according to an aspect of the present invention is a measuring method for measuring a surface form of a measurement surface, the measurement surface being a tread surface or a sidewall surface of a tire having a projection formed thereon, the method including: a first measuring step of performing a measurement process a plurality of times while shifting a spotlight in a sub-scanning direction, and acquiring a plurality of pieces of measurement data, the measurement process including illuminating the measurement surface with the spotlight, scanning the measurement surface in a main-scanning direction with the spotlight, receiving reflected light, and acquiring measurement data for one line; a first acquisition step of generating pieces of one-dimensional height data respectively from the plurality of pieces of measurement data, arranging the plurality of generated pieces of one-dimensional height data in a matrix, and generating two-dimensional height data of the measurement surface; and a generation step of extracting the projection from the two-dimensional height data using an edge detection filter, associating a position of the extracted projection with the two-dimensional height data, and generating reference form data.

BRIEF DESCRIPTION OF DRAWINGS

FIG. 4(A) illustrates the sidewall surface of the tire, and FIG. 4(B) illustrates the tread surface of the tire.

FIG. 10 is a flowchart illustrating a process of calculating reference form data in the embodiment of the present invention.

FIG. 11 is a flowchart illustrating a process of measuring a target tire in the embodiment of the present invention.

DESCRIPTION OF EMBODIMENTS

Figure 4:
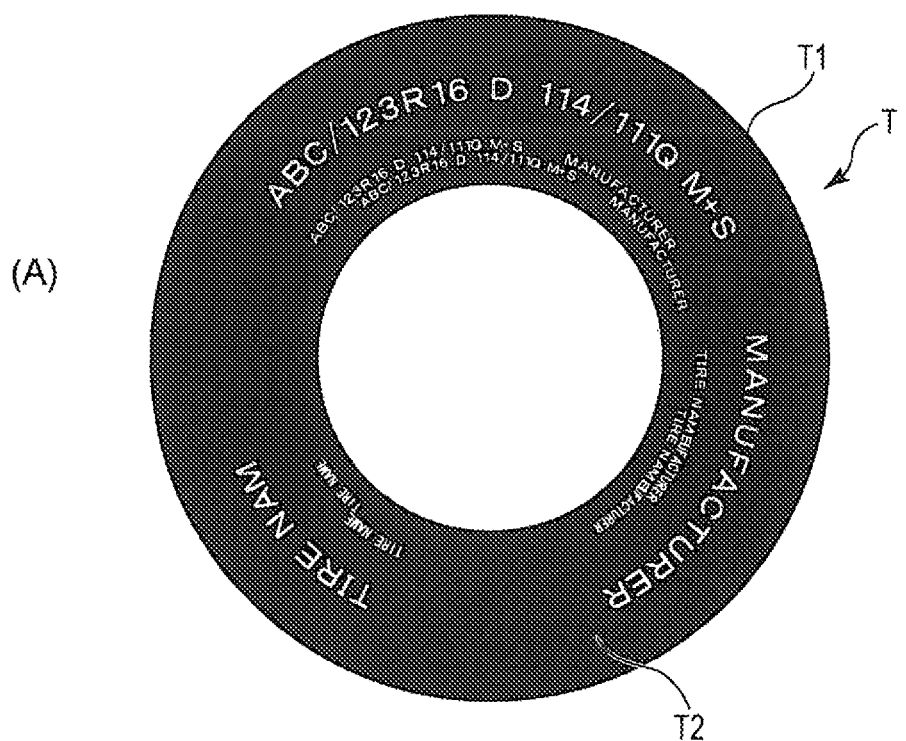
FIG. 4 includes schematic diagrams illustrating the external appearance of a tire, which is a measurement object.
Figure 4:
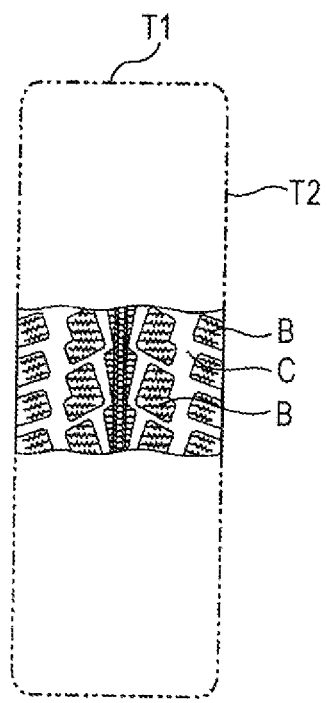

FIG. 4 includes schematic diagrams illustrating the external appearance of a tire T, which is a measurement object. FIG. 4(A) illustrates a sidewall surface T2 of the tire T, and FIG. 4(B) illustrates a tread surface T1 of the tire T. The tire T has two sidewall surfaces T2 oriented substantially perpendicular to the road surface, and the tread surface T1 that connects the two sidewall surfaces T2.

The tread surface T1 has a curved form so as to project outward in the radial direction of the tire T, and surrounds the periphery of the tire T. On the tread surface T1, a plurality of blocks B that project outward in the radial direction and that have top portions which serve as supporting surfaces are formed. Furthermore, on the tread surface T1, a groove C sandwiched by the blocks B is formed. On the sidewall surface T2, multiple projecting characters are formed, and therefore, complex irregularities are formed. The characters formed on the sidewall surface T2 represent the type of tire, the manufacturer name, and the like, for example. Fine patterns other than characters are also formed on the sidewall surface T2, and therefore, fine irregularities are distributed in the circumferential direction. In this embodiment, the tread surface T1 or the sidewall surface T2 is assumed to be a measurement surface, and height data of the measurement surface is obtained.

Figure 1:
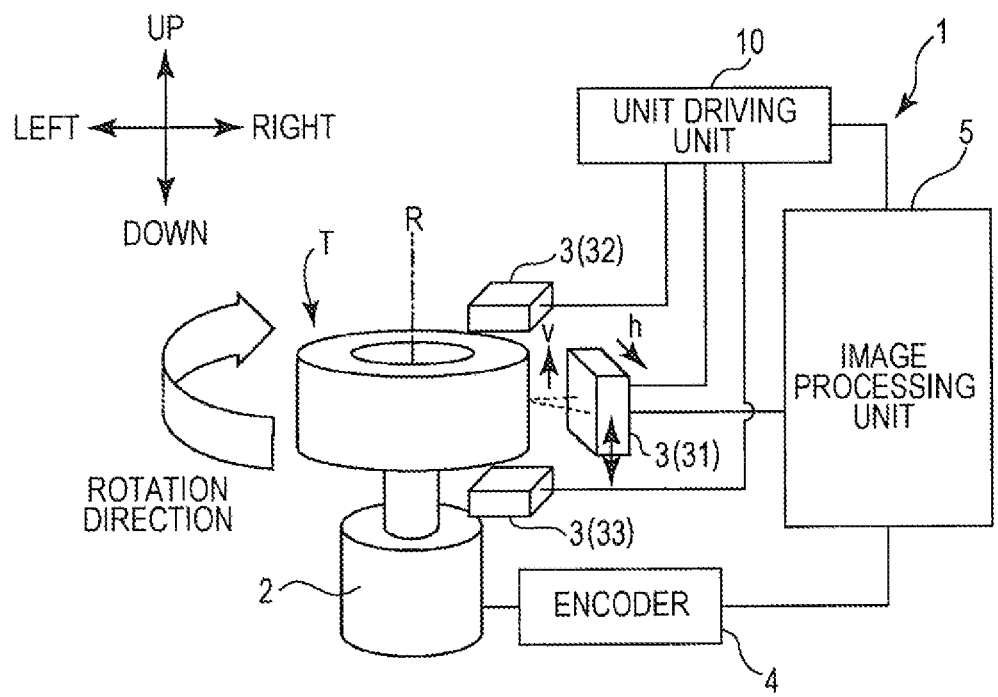
FIG. 1 is a diagram illustrating an overall configuration of a measuring device 1 according to an embodiment of the present invention.

FIG. 1 is a diagram illustrating an overall configuration of a measuring device 1 according to the embodiment of the present invention. The measuring device 1 includes a rotating unit 2, a sensor unit 3, an encoder 4, an image processing unit 5, and a unit driving unit 10. The rotating unit 2 rotates the tire T about a rotation axis R, which is the center axis. Specifically, the rotating unit 2 includes a shaft that is fit in line with the center axis of the tire T, a motor that rotates the shaft, and the like. As the rotation speed of the tire T attained by the rotating unit 2, 60 rpm is employed, for example.

The sensor unit 3 includes a sensor unit 31 that is provided on the side of the tread surface of the tire T, a sensor unit 32 that is provided above one sidewall surface of the tire T, and the sensor unit 33 that is provided below the other sidewall surface of the tire T. The sensor unit 31 is used when measurement of the tread surface is performed, the sensor unit 32 is used when measurement of the upper sidewall surface is performed, and a sensor unit 33 is used when measurement of the lower sidewall surface is performed.

The sensor unit 31 performs a measurement process of illuminating the tire T that is rotating with a spotlight, scanning the tread surface in the circumferential direction (main-scanning direction) with the spotlight, receiving reflected light from the tire T, and acquiring measurement data for one line which includes information regarding the height of the tread surface. When the sensor unit 31 has acquired the measurement data for one line, the sensor unit 31 moves vertically by a predetermined pitch in accordance with control performed by the unit driving unit 10, shifts the spotlight in the width direction of the tire T (sub-scanning direction), reperforms the measurement process, and acquires measurement data for one line. The sensor unit 31 repeatedly performs the measurement process and acquires measurement data of the entire tread surface.

The sensor units 31 and 32 perform a measurement process a plurality of times while shifting a spotlight in a sub-scanning direction and acquire measurement data of the entire areas of the respective sidewall surfaces in a manner similar to the sensor unit 33. In a case where measurement of the sidewall surface is performed, the main-scanning direction is a direction concentric with the rotation axis R, and the sub-scanning direction is the radial direction of the sidewall surface.

The encoder 4 outputs, to the image processing unit 5, an angle signal indicating the rotation angle each time the tire T rotates by a predetermined angle. The angle signal is used in determining a measurement timing of the sensor unit 3.

The image processing unit 5 is constituted by a dedicated hardware circuit, a CPU, and the like, for example, and performs a process described below on the measurement data output from the sensor unit 3. The unit driving unit 10 includes three arms (not illustrated) for making the sensor units 31 to 33 perform scanning in the sub-scanning direction, three motors for moving the three arms respectively, and the like, and positions the sensor units 31 to 33 in accordance with control performed by the image processing unit 5.

Note that, in FIG. 1, a configuration is illustrated in which the sensor unit 3 includes the sensor units 31 to 33; however, the sensor unit 3 is not limited to such a configuration. For example, any one or two of the sensor units 31 to 33 may be omitted. In a case where the sensor unit 3 includes one sensor unit, it is preferable to provide the sensor unit 31 because there is a strong need for measurement of the form of the tread surface.

Figure 2:
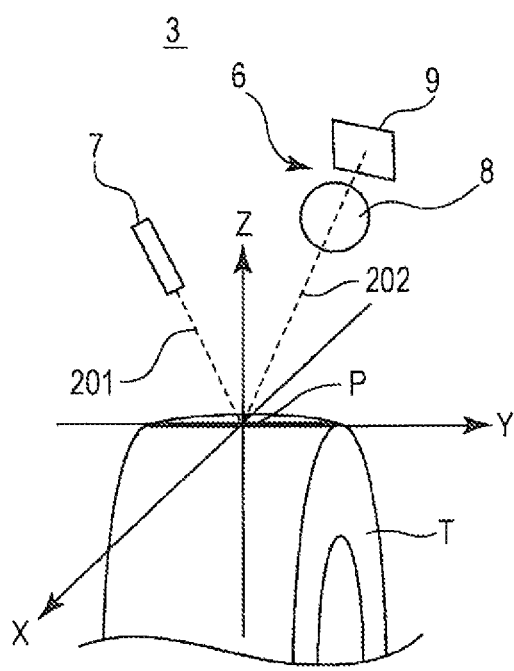
FIG. 2 is a diagram illustrating a detailed configuration of a sensor unit.

FIG. 2 is a diagram illustrating a detailed configuration of the sensor unit 3. FIG. 2 illustrates the sensor unit 3 that measures the tread surface. In FIG. 2, the Y axis represents the sub-scanning direction parallel to the rotation axis R (see FIG. 1), the Z axis represents the normal direction at a measurement point P, and the X axis represents a direction perpendicular to the Y axis and the Z axis.

A light source 7 is a spotlight source that includes a semiconductor laser, a condensing lens, and the like, and forms the measurement point P by illuminating the measurement surface with a spotlight 201 of a small diameter. Here, the light source 7 emits a spotlight in a direction that intersects with the Z axis. The tire T is rotated by the rotating unit 2, and therefore, the entire measurement surface of the tire T can be scanned with the spotlight 201.

A camera 6 includes a camera lens 8, an image sensor (photodetector) 9, and a data processing unit (not illustrated). The camera lens 8 guides reflected light 202 from the measurement point P to the image sensor 9. The image sensor 9 is constituted by a CCD image sensor, a CMOS image sensor, or the like, for example, and receives the reflected light 202 through the camera lens 8. The image sensor 9 captures an image of the measurement point P in accordance with control performed by the image processing unit 5. The data processing unit (not illustrated) identifies the light receiving position of the reflected light from image capture data of the image captured by the image sensor 9. The data processing unit plots a plurality of identified light receiving positions on an image memory of the image sensor 9 while the tire T rotates one revolution, generates one piece of image data, and outputs the piece of image data to the image processing unit 5 as measurement data.

When the height of the measurement point P changes, the light receiving position of the reflected light changes in response to the change. It is assumed that the change occurs in the horizontal direction h of the image sensor 9, for example (see FIG. 1). Then, the data processing unit plots, on the image memory, the coordinate of the light receiving position in the horizontal direction h, in the vertical direction v at a constant pitch, generates image capture data that represents measurement data for one line, and outputs the image capture data to the image processing unit 5.

Note that the reflected light 202 is preferably regular reflected light, and therefore, the camera lens 8 is configured to guide regular reflected light to the image sensor 9.

Figure 3:
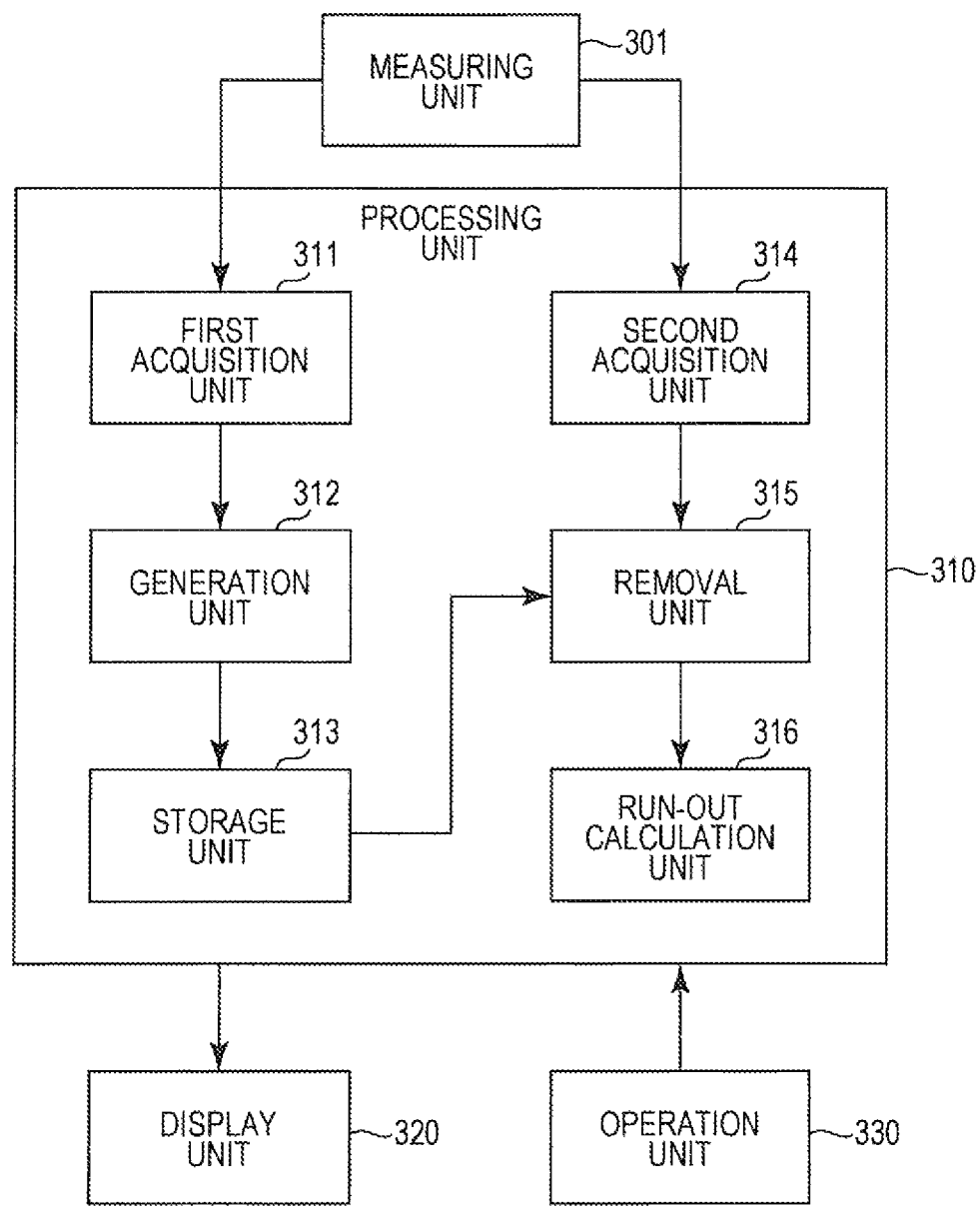
FIG. 3 is a block diagram illustrating a functional configuration of the measuring device illustrated in FIG. 1.

FIG. 3 is a block diagram illustrating a functional configuration of the measuring device 1 illustrated in FIG. 1. The measuring device 1 includes a measuring unit 301, a processing unit 310, a display unit 320, and an operation unit 330. The measuring unit 301 includes the rotating unit 2, the sensor unit 3, and the unit driving unit 10 illustrated in FIG. 1, repeatedly performs the measurement process for acquiring measurement data for one line, and acquires measurement data for a plurality of lines. The measuring unit 301 performs the measurement process on the measurement surface of a target tire, which is a measurement object different from a reference tire, and acquires measurement data for one line.

The processing unit 310 is constituted by the image processing unit 5 illustrated in FIG. 1 and includes a first acquisition unit 311, a generation unit 312, a storage unit 313, a second acquisition unit 314, a removal unit 315, and a run-out calculation unit 316.

The first acquisition unit 311 generates pieces of one-line height data respectively from a plurality of pieces of measurement data obtained by the measuring unit 301, arranges the plurality of generated pieces of one-dimensional height data in a matrix, and generates two-dimensional height data of the measurement surface. In doing so, if it is assumed that the number of pieces of data in the main-scanning direction is N, and the number of pieces of data in the sub-scanning direction is M, for example, two-dimensional height data including pieces of height data arranged in M rows and N columns is obtained.

Here, the first acquisition unit 311 may calculate one-dimensional height data by applying a geometric technique, such as a triangulation method, to measurement data for one line. Note that the first acquisition unit 311 may calculate one-dimensional height data by using a TOF (Time of Flight) method instead of a triangulation method.

The generation unit 312 extracts a projection from the two-dimensional height data by using an edge detection filter, associates the position of the extracted projection with the two-dimensional height data, and generates reference form data. In this case, a projection has been intentionally formed and is a projecting character or pattern that has been formed on the measurement surface. In the example illustrated in FIG. 4(A), any projecting character that has been formed on the sidewall surface T2 is a projection. In the example illustrated in FIG. 4(B), the block B is a projection.

Here, a Sobel filter may be employed, for example, as an edge detection filter. However, a Sobel filter is merely an example, and any filter may be employed as long as the filter is a two-dimensional differentiation filter that can extract the boundary of a projection.

Specifically, the generation unit 312 sequentially sets the positions in the two-dimensional height data as positions of interest, places the center of the edge detection filter at each of the positions of interest, performs a two-dimensional filter process, and calculates the edge values at the positions of interest. That is, the generation unit 312 shifts the two-dimensional edge detection filter relative to the two-dimensional height data in a manner similar to performing raster scanning to thereby calculate the edge values at the positions of interest. If an edge value is larger than a specified value, it is determined that the position corresponding to the edge value represents the boundary of a projection. The generation unit 312 determines that a region surrounded by height data, the edge value of which is larger than the specified value, is a projection, and associates a height component that indicates the height of the projection with the height data of the region that has been determined to be a projection. Calculation of a height component will be described in detail below.

As described above, in this embodiment, the generation unit 312 extracts the boundary of a projection by using a two-dimensional edge detection filter for two-dimensional height data. Accordingly, the boundary of a projection can be extracted by not only using information on height data adjacent to a position of interest in the main-scanning direction but also using information on height data adjacent to the position of interest in the sub-scanning direction. As a result, the boundary of a projection can be extracted with a higher accuracy in this embodiment than a case of performing a one-dimensional filter process on one-dimensional height data to extract the boundary of a projection.

Reference form data has a data structure that includes M pieces of height data arranged in the sub-scanning direction and N pieces of height data arranged in the main-scanning direction as described above. Furthermore, in reference form data, data indicating the height component of a projection is associated with height data corresponding to the projection. Hereinafter, regarding two-dimensional height data in reference form data, height data at a position is represented by Hr(i, j), where i is an integer between 1 and M, and j is an integer between 1 and N.

The storage unit 313 is constituted by a non-volatile rewritable storage device, for example, and stores reference height data generated by the generation unit 312.

The second acquisition unit 314 acquires one-dimensional height data from form data for one line obtained by the measuring unit 301 from a target tire. Here, one-dimensional height data acquired from the target tire is referred to as target one-dimensional height data in order to distinguish from one-dimensional height data of a reference tire.

The removal unit 315 compares target one-dimensional height data with one-dimensional height data in reference form data (reference one-dimensional height data), the corresponding position of which in the sub-scanning direction is the same as the target one-dimensional height data, and removes the height component of a projection from the target one-dimensional height data. For example, it is assumed that the target one-dimensional height data is one-dimensional height data where M=2. Then, the removal unit 315 reads, from the reference form height data stored in the storage unit 313, one-dimensional height data where M=2 as reference one-dimensional height data. In the reference one-dimensional height data, it is assumed that height data Hr(2, 3) where N=3 is height data of a projection. Then, the removal unit 315 subtracts a height component Δh(2, 3) associated with the height data Hr(2, 3) from height data H(2, 3) at the position N=3 in the target one-dimensional height data to thereby remove the height component Δh of the projection from the target one-dimensional height data.

The run-out calculation unit 316 identifies the maximum value and the minimum value of the target one-dimensional height data from which the height component Δh has been removed by the removal unit 315, and calculates the difference between the maximum value and the minimum value as a run-out value.

The display unit 320 is constituted by a display device, such as a liquid crystal panel, and displays the result of a process performed by the processing unit 310. The operation unit 330 is constituted by a touch panel and various buttons and accepts an operation instruction given by a user.

Figure 5:
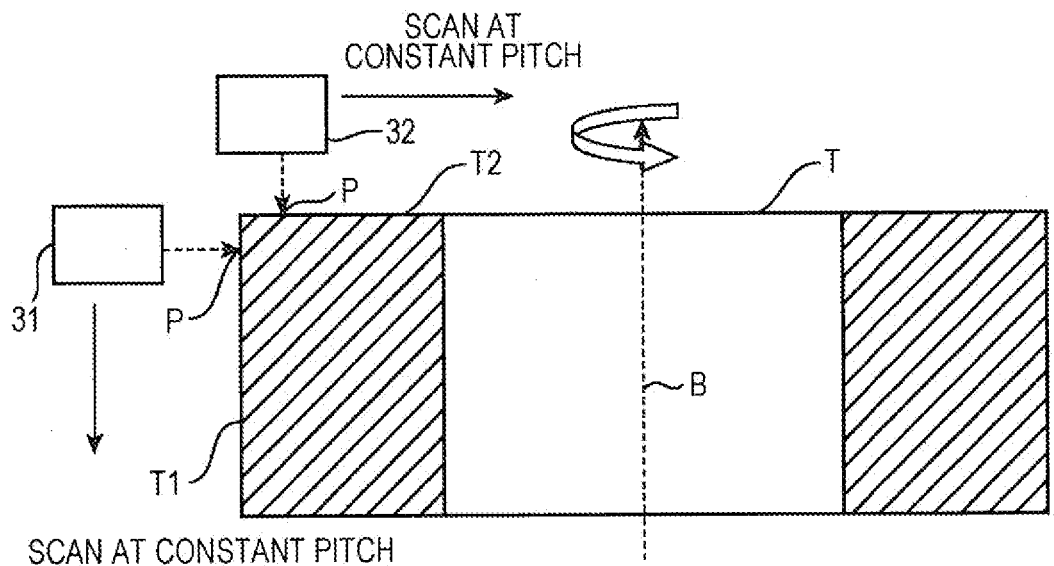
FIG. 5 is a schematic diagram illustrating the way the sensor unit measures the tire.

FIG. 5 is a schematic diagram illustrating the way the sensor unit 3 measures the tire T. In FIG. 5, the tread surface T1 of the tire T faces the front. The sensor unit 31 illuminates, with a spotlight, the measurement point P on the tread surface T1 of the tire T that is rotating, and acquires measurement data for one line. When the sensor unit 31 has acquired the measurement data for one line, the sensor unit 31 moves downward by a predetermined pitch and acquires measurement data for the subsequent one line. The sensor unit 31 repeats the process and acquires measurement data of the entire area of the tread surface T1.

The sensor unit 32 illuminates, with a spotlight, the measurement point P on the sidewall surface T2 similarly to the sensor unit 31, and acquires measurement data for one line. When the sensor unit 32 has acquired the measurement data for one line, the sensor unit 32 moves rightward by a predetermined pitch and acquires measurement data for the subsequent one line. In this way, measurement data of the entire area of the sidewall surface T2 is obtained.

Figure 6:
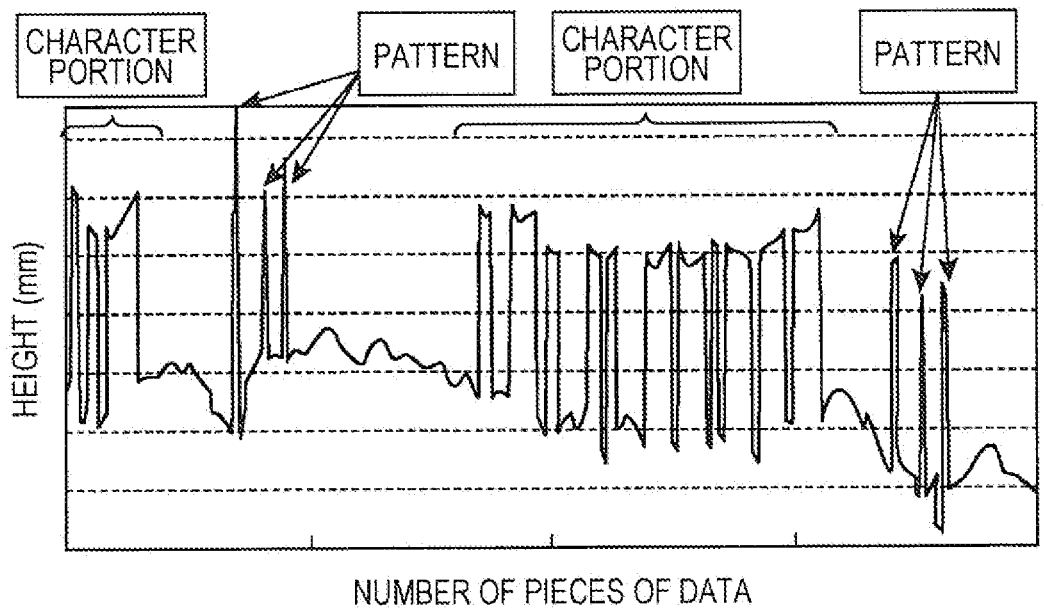
FIG. 6 is a graph illustrating an example of the result of one-dimensional height data measurement at a position in a sub-scanning direction on the sidewall surface.

FIG. 6 is a graph illustrating an example of the result of one-dimensional height data measurement at a position in the sub-scanning direction on the sidewall surface T2. In FIG. 6, the vertical axis represents the height in units of millimeter, for example, and the horizontal axis represents the number of pieces of data in the main-scanning direction. Note that the number of pieces of data is determined in accordance with the image capture rate of the camera 6, and increase as the image capture rate becomes higher.

It is found from FIG. 6 that one-dimensional height data shows projections caused by characters and patterns. If a run-out value is obtained from such one-dimensional height data, the run-out value is affected by the projections that have been intentionally formed, and therefore, a defect in a tire cannot be accurately evaluated.

Accordingly, in this embodiment, before starting measurement of a target tire, the above-described measurement is performed on a reference tire on which the same projections have been formed at the same positions as the target tire, obtains reference form data, and stores the data in the storage unit 313. That is, reference form data of a reference tire, which is a tire of the same type as a target tire, is obtained in advance.

More specifically, as illustrated in FIG. 5, the sidewall surface T2 is scanned with a spotlight in the radius direction at a pitch of equal to or less than 1 mm, the tread surface T1 is scanned with a spotlight in the width direction at a pitch of equal to or less than 1 mm, measurement data is acquired, and reference form data is calculated from the acquired measurement data. The value of the pitch of equal to or less than 1 mm is merely an example, and an appropriate value may be employed in accordance with the size of the tire or the spot diameter of a spotlight to be used.

Accordingly, measurement data for one line is acquired for the target tire, target one-dimensional height data is obtained, the target one-dimensional height data is compared with reference one-dimensional height data, the corresponding position of which in the sub-scanning direction is the same as the target one-dimensional height data, and the height component of a projection is subtracted from the target one-dimensional height data. As a result, a run-out value can be obtained by using the target one-dimensional height data from which an effect caused by the projection has been eliminated, and a run-out value that is appropriate for evaluation of a defect in the tire can be obtained.

Figure 7:
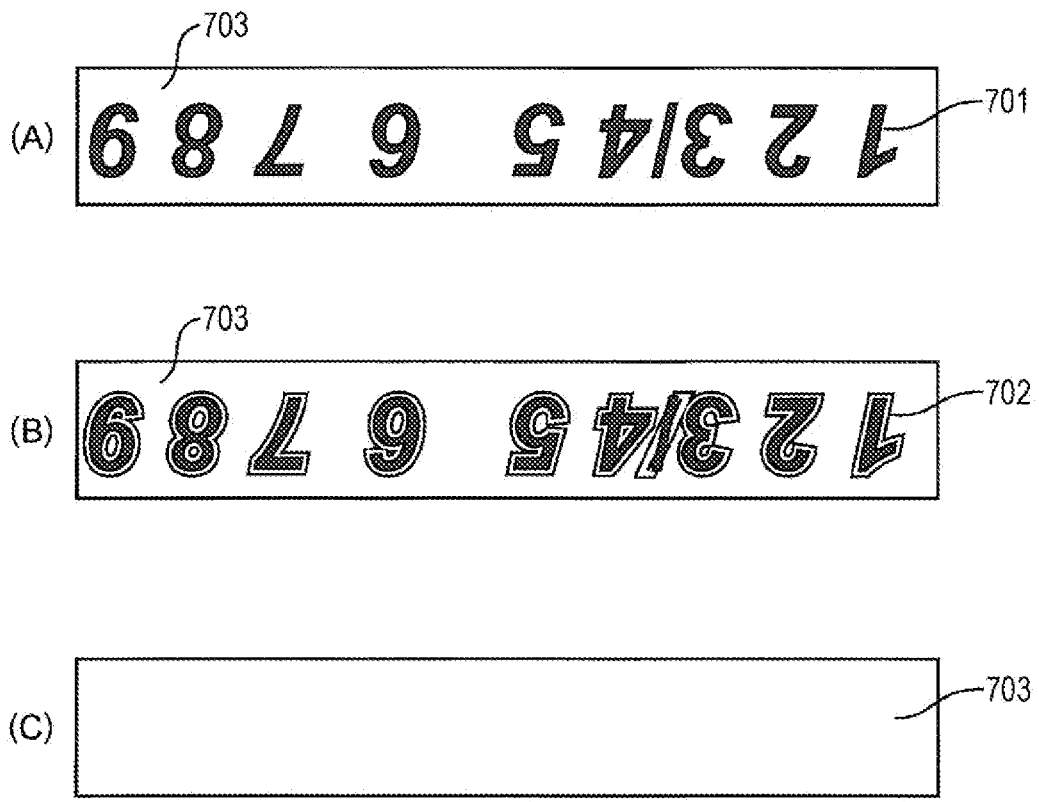
FIG. 7(A) is a diagram illustrating an example of two-dimensional height data of a reference tire when the height data is represented in gray scale.
FIG. 7(B) is a diagram representing two-dimensional height data obtained by superimposing the boundary of a projection on the two-dimensional height data illustrated in FIG. 7(A).
FIG. 7(C) is a diagram illustrating an example of two-dimensional height data obtained by removing the height component of the projection from the two-dimensional height data illustrated in FIG. 7(A).

FIG. 7(A) is a diagram illustrating an example of two-dimensional height data of a reference tire when the height data is represented in gray scale. FIG. 7(B) is a diagram representing two-dimensional height data obtained by superimposing a boundary 702 of a projection on the two-dimensional height data illustrated in FIG. 7(A). FIG. 7(C) is a diagram illustrating an example of two-dimensional height data obtained by removing the height component of a projection 701 from the two-dimensional height data illustrated in FIG. 7(A).

In FIG. 7(A), any character in "123/45 6 789" is assumed to be the projection 701. On the two-dimensional height data illustrated in FIG. 7(A), a filter process is performed by using a two-dimensional edge detection filter. Here, a Sobel filter is used as a two-dimensional edge detection filter. However, a Sobel filter is merely an example, and any filter, such as a Laplacian filter, may be employed as a two-dimensional edge detection filter as long as the filter can extract boundaries. Alternatively, different types of filters may be combined and used. For example, a Sobel filter and a Laplacian filter may be individually used for two-dimensional height data, and the average of edge values at each position may be compared with a threshold to thereby extract a boundary. Alternatively, the weighted average of edge values at each position obtained by using both of the filters may be compared with a threshold to thereby extract a boundary.

When a filter process is performed on the two-dimensional height data illustrated in FIG. 7(A) using a Sobel filter, positions at which the edge values are larger than a threshold are extracted as the boundary 702 of a projection as illustrated in FIG. 7(B).

Next, a region surrounded by the boundary 702 is extracted as the projection 701, and a reference value of height data, in the two-dimensional height data, at each position in a background region 703 other than the projection 701 is calculated. Here, as the reference value of height data, the average of height data of the background region 703 may be employed, or the median thereof may be employed.

Next, the reference value of height data is subtracted from height data at each position in the projection 701, the height component Δh at each position in the projection 701 is calculated, and reference form data is generated by associating the height component Δh with the two-dimensional height data illustrated in FIG. 7(A). For example, it is assumed that a position (i, j) in the two-dimensional height data belongs to the projection 701. Then, a height component having a data structure of a height component Δh(i, j) is generated. Accordingly, it is found that the position (i, j) belongs to the projection 701, and the value of the height component is Δh(i, j).

When the height component Δh is subtracted from the two-dimensional height data illustrated in FIG. 7(A), the two-dimensional height data illustrated in FIG. 7(C) is obtained. It is found from the two-dimensional height data illustrated in FIG. 7(C) that the projection 701 shown in FIG. 7(A) has been removed. Note that, in FIG. 7(C), regarding the height data of the boundary 702, linear interpolation is performed using the height data of the adjacent background region 703 and the height data of the projection 701 after subtraction of the height component Δh to thereby smoothly connect the projection 701 and the background region 703.

FIG. 10 is a flowchart illustrating a process of calculating reference form data in the embodiment of the present invention. First, the measuring unit 301 rotates a reference tire, illuminates the measurement surface with a spotlight, and receives reflected light to thereby acquire measurement data for one line (S101).

Next, the first acquisition unit 311 calculates one-dimensional height data from the measurement data for one line (S102). Next, if acquisition of measurement data for all lines is not completed (No in S103), the measuring unit 301 moves the sensor unit 3 in the sub-scanning direction by a predetermined pitch (S104), the process returns to S101, and the measuring unit 301 acquires measurement data for the subsequent one line.

On the other hand, if acquisition of measurement data for all lines is completed (Yes in S103), the generation unit 312 arranges pieces of one-dimensional height data for all lines in a matrix and generates two-dimensional height data (S105).

Next, the generation unit 312 performs a two-dimensional filter process using an edge detection filter on the two-dimensional height data and extracts the boundary of a projection from the two-dimensional height data (S106). Here, the generation unit 312 generates a boundary image by representing the two-dimensional height data obtained after the filter process in binary. As a result, the boundary image in which the boundary of a projection has a value of 1 and a region other than the boundary has a value of 0 is obtained.

Next, the generation unit 312 sequentially performs a compression process and a decompression process on the boundary image (S107). Here, the generation unit 312 divides the boundary image into a plurality of blocks, assigns the value 0 to a block including pixels having the value 1, the number of the pixels being equal to or less than a predetermined number, assigns the value 1 to a block including pixels having the value 1, the number of the pixels being larger than the predetermined number, and compresses the boundary image. Next, the generation unit 312 decompresses the compressed image to recover the original resolution so that the values of all pixels in the block assigned the value 1 become 1, and the values of all pixels in the block assigned the value 0 become 0. As a result, noise (unexpected value) that locally occurs in the two-dimensional height data due to electric noise, a foreign matter, and the like is removed.

Next, the generation unit 312 extracts a region surround by the boundary of a projection as a projection (S108). Next, the generation unit 312 calculates a reference value of a background region, the background region being a region other than the projection, from height data at each position in the background region (S109).

Next, the generation unit 312 subtracts the reference value of the background region from height data at each position in the projection, in the two-dimensional height data, and calculates the height component at each position in the projection (S110). Next, the generation unit 312 generates reference form data while associating the height components of the projection with the two-dimensional height data (S111). Next, the generation unit 312 stores the reference form data in the storage unit 313 (S112).

FIG. 11 is a flowchart illustrating a process of measuring a target tire in the embodiment of the present invention.

First, the measuring unit 301 rotates a target tire, illuminates the measurement surface with a spotlight, and receives reflected light to thereby acquire measurement data for one line (S201). Next, the second acquisition unit 314 calculates target one-dimensional height data from the measurement data (S202).

Next, the removal unit 315 reads, from the storage unit 313, one-dimensional height data in the reference form data (reference one-dimensional height data), the corresponding position of which in the sub-scanning direction is the same as the target one-dimensional height data (S203). It is assumed that the reference one-dimensional height data is constituted by one-dimensional height data for M rows. Then, the first to M-th positions are present as the positions at which the sensor unit 3 is positioned in the sub-scanning direction. Accordingly, the removal unit 315 can identify a row of the reference form data, the row including one-dimensional height data corresponding to the reference one-dimensional height data, in accordance with the position in the sub-scanning direction at which the sensor unit 3 is positioned.

Next, the removal unit 315 performs a phase adjustment process on the target one-dimensional height data and the reference one-dimensional height data (S204). Both the target tire and the reference tire have the same rotation reference position regarding the rotation angle, and therefore, a phase shift does not basically occur in the target one-dimensional height data and the reference one-dimensional height data. However, the rotation reference position may shift to some extent depending on the measurement condition. In this case, the position of a projection in the target one-dimensional height data shifts from the position of the projection in the reference height data, and therefore, the height component of the projection cannot be accurately removed from the target one-dimensional height data. Accordingly, a phase adjustment process is performed on the target one-dimensional height data and the reference one-dimensional height data.

Specifically, the removal unit 315 searches for a position at which the error between the reference one-dimensional height data and the target one-dimensional height data is minimum using a least squares method while shifting the target one-dimensional height data within the range from 5° in the plus direction to 5° in the minus direction, for example, relative to the reference one-dimensional height data, and obtains a shift amount when the error is minimum. Then, the removal unit 315 shifts the target one-dimensional height data by the shift amount relative to the reference one-dimensional height data to thereby adjust the phase of the target one-dimensional height data to the phase of the reference one-dimensional height data. Note that a region for which either one of the reference one-dimensional height data and the target one-dimensional height data is present due to the shift may be excluded from the operation.

Next, the removal unit 315 identifies a region of a projection in the target one-dimensional height data using the reference one-dimensional height data, subtracts the height component from height data at each position in the region of the projection to thereby exclude the projection from the target one-dimensional height data (S205).

Next, the run-out calculation unit 316 obtains the difference between the maximum value and the minimum value from the target one-dimensional height data from which the projection has been excluded to thereby calculate a run-out value (S206).

Figure 8:
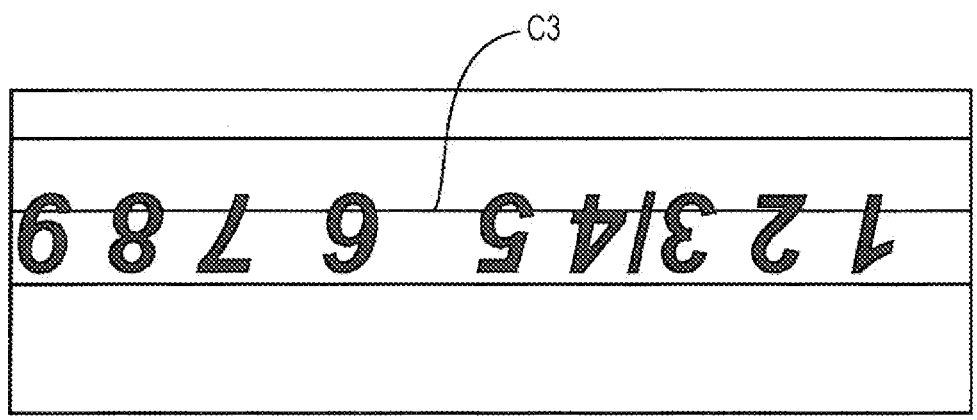
FIG. 8 is a diagram illustrating two-dimensional height data of a target tire when the height data is represented in gray scale.

FIG. 8 is a diagram illustrating two-dimensional height data of a target tire when the height data is represented in gray scale. Form data on the inspection lines illustrated in FIG. 8 is obtained, and target one-dimensional height data is acquired.

Figure 9:
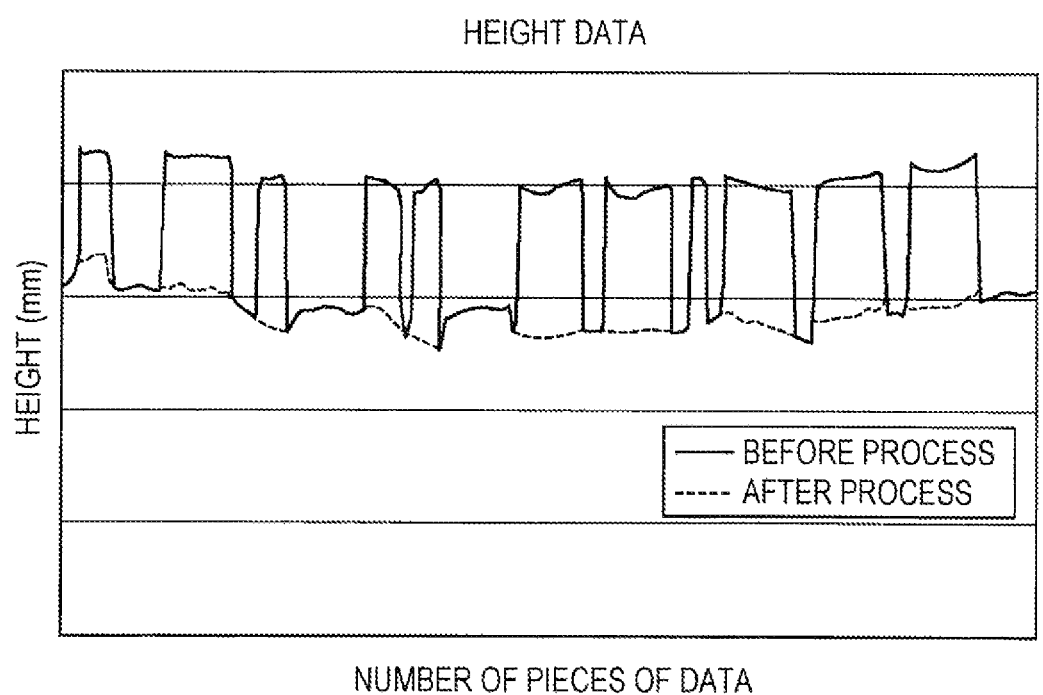
FIG. 9 is a graph indicating the result of target one-dimensional height data measurement on an inspection line illustrated in FIG. 8.

FIG. 9 is a graph indicating the result of target one-dimensional height data measurement on an inspection line C3 illustrated in FIG. 8, and the vertical axis represents the height while the horizontal axis represents the number of pieces of data. In FIG. 9, the solid line represents target one-dimensional height data before height components are removed, and the dotted line represents the target one-dimensional height data after the height components have been removed.

It is found from FIG. 9 that the target one-dimensional height data from which height components of projections have been removed, as illustrated by the dotted line, is obtained by removing the height components from the target one-dimensional height data using the reference one-dimensional height data.

As described above, in this embodiment, projections can be excluded from target one-dimensional height data with a high accuracy, and a defect in a tire can be accurately evaluated.

Note that, in the above-described embodiment, the tire T is scanned with a spotlight in the main-scanning direction by rotating the tire T. However, the present invention is not limited to such a case. The tire T may be scanned with a spotlight in the main-scanning direction by shifting the spotlight relative to the stationary tire T.

The embodiment disclosed herein is illustrative in all aspects and is not restrictive. In particular, regarding matters not explicitly disclosed in the embodiment, such as operation conditions, measurement conditions, various parameters, and the dimensions, weight, and volume of components, for example, values are employed that do not depart from the scope which those skilled in the art generally implements, and that are easily conceivable by those of ordinary skill in the art.

[Conclusion of the Embodiment]

(1) A measuring method according to an aspect of the present invention is a measuring method for measuring a surface form of a measurement surface, the measurement surface being a tread surface or a sidewall surface of a tire having a projection formed thereon, the method including: a first measuring step of performing a measurement process a plurality of times while shifting a spotlight in a sub-scanning direction, and acquiring a plurality of pieces of measurement data, the measurement process including illuminating the measurement surface with the spotlight, scanning the measurement surface in a main-scanning direction with the spotlight, receiving reflected light, and acquiring measurement data for one line; a first acquisition step of generating pieces of one-dimensional height data respectively from the plurality of pieces of measurement data, arranging the plurality of generated pieces of one-dimensional height data in a matrix, and generating two-dimensional height data of the measurement surface; and a generation step of extracting the projection from the two-dimensional height data using an edge detection filter, associating a position of the extracted projection with the two-dimensional height data, and generating reference form data.

With the above-described configuration, a measurement process for acquiring measurement data for one line is performed by scanning with a spotlight in the main-scanning direction. The measurement process is repeated while shifting the spotlight in the sub-scanning direction, a plurality of pieces of measurement data are acquired, and two-dimensional height data of the entire measurement surface is generated. Accordingly, the cost of the device can be reduced compared to a case where a configuration is employed in which two-dimensional height data of the entire measurement surface is generated using a line laser.

Furthermore, a projection is extracted by using a two-dimensional edge detection filter for two-dimensional height data. Therefore, an edge value can be calculated by not only using information on height data adjacent to the position of interest in the main-scanning direction but also using information on height data adjacent to the position of interest in the sub-scanning direction. As a result, the boundary of a projection, such as a character or a pattern that has been intentionally formed, can be extracted with a high accuracy.

(2) Preferably, the measuring method further includes: a second measuring step of performing the measurement process on the measurement surface of a target tire, which is a measurement object, and acquiring the measurement data for one line; a second acquisition step of generating one-dimensional height data using the measurement data acquired in the second measuring step; and a removal step of comparing target one-dimensional height data, which is the one-dimensional height data acquired in the second acquisition step, with one-dimensional height data in the reference form data, a corresponding position of which in the sub-scanning direction is the same as the target one-dimensional height data, and removing a height component of the projection from the target one-dimensional height data.

With the above-described configuration, measurement data for one line is acquired for a target tire, which is a measurement object, and target one-dimensional height data is acquired. Then, one-dimensional height data, the corresponding position of which in the sub-scanning direction is the same as the target one-dimensional height data, is identified from the reference form data. Thereafter, the target one-dimensional height data is compared with the identified one-dimensional height data, and the height component of a projection is removed from the target one-dimensional height data. Accordingly, a projection can be accurately excluded from the target one-dimensional height data. Furthermore, a projection is excluded from the target one-dimensional height data, and therefore, a defect in the tire can be accurately determined by using the data.

(3) Preferably, the measuring method further includes a run-out calculation step of calculating a difference between a maximum value and a minimum value of the target one-dimensional height data from which the height component has been removed in the removal step, as a run-out value of the target tire.

With the above-described configuration, a run-out value is calculated using the target one-dimensional height data from which the height component of a projection has been removed, and therefore, a run-out value that is not affected by the projection can be obtained, and a defect in the target tire can be accurately evaluated by using the run-out value.

(4) Preferably, in the measuring method, the edge detection filter is a Sobel filter.

With the above-described configuration, a Sobel filter is used, and therefore, the boundary of a projection can be extracted from two-dimensional height data with a high accuracy.

(5) Preferably, in the measuring method, in a case where the measurement surface is the tread surface, the main-scanning direction is a circumferential direction of a tire, and the sub-scanning direction is a width direction of the tire, and, in a case where the measurement surface is the sidewall surface, the main-scanning direction is a direction concentric with a rotation axis of the tire, and the sub-scanning direction is a radial direction of the tire.

With the above-described configuration, a spotlight can be emitted in the main-scanning direction and in the sub-scanning direction appropriately in accordance with the measurement surface.

The invention claimed is:

1. A measuring method for measuring a surface form of a measurement surface, the measurement surface being a tread surface or a sidewall surface of a tire having a projection formed thereon, the method comprising:
a first measuring step of performing a measurement process a plurality of times while shifting a spotlight emitted from a spot light source in a sub-scanning direction on a reference tire, and acquiring a plurality of pieces of measurement data, the measurement process including illuminating the measurement surface with the spotlight, scanning the measurement surface in a main-scanning direction with the spotlight, receiving reflected light, and acquiring measurement data for one line;
a first acquisition step of generating pieces of one-dimensional height data respectively from the plurality of pieces of measurement data, arranging the plurality of generated pieces of one-dimensional height data in a matrix, and generating two-dimensional height data of the measurement surface;
a step of generating reference form data of the reference tire by: extracting a boundary of the projection from the two-dimensional height data using an edge detection filter; extracting a region surrounded by the extracted boundary as the projection; and associating a position of the extracted projection with the two-dimensional height data;
a second measuring step of performing the measurement process on the measurement surface of a target tire, which is a measurement object, and acquiring the measurement data for one line;
a second acquisition step of generating one-dimensional height data using the measurement data acquired in the second measuring step; and
a removal step of comparing target one-dimensional height data, which is the one-dimensional height data acquired in the second acquisition step, with one-dimensional height data in the reference form data, a corresponding position of which in the sub-scanning direction is the same as the target one-dimensional height data, and removing a height component of the projection from the target one-dimensional height data, wherein
in the step of generating the reference form data, an average or a median of height data at each position in a background region other than the projection is calculated as a reference value of the background region from height data at each position of the two-dimensional height data, a height component at each position in the projection is generated by subtracting the reference value from height data at each position in the projection, and the generated height component is associated with the two-dimensional height data, and
in the removal step, a region of the projection in the target one-dimensional height data is identified using one-dimensional height data in the reference form data, a corresponding position of which in the sub-scanning direction is the same as the target one-dimensional height data, and the height component is subtracted from the height data at each position in the identified region of the projection to thereby exclude the projection from the target one-dimensional height data.

2. The measuring method according to claim 1, further comprising:
a run-out calculation step of calculating a difference between a maximum value and a minimum value of the target one-dimensional height data from which the height component has been removed in the removal step, as a run-out value of the target tire.

3. The measuring method according to claim 1, wherein the edge detection filter is a Sobel filter.

4. The measuring method according to claim 1, wherein
in a case where the measurement surface is the tread surface, the main-scanning direction is a circumferential direction of a tire, and the sub-scanning direction is a width direction of the tire, and
in a case where the measurement surface is the sidewall surface, the main-scanning direction is a direction concentric with a rotation axis of the tire, and the sub-scanning direction is a radial direction of the tire.

5. A measuring device that measures a surface form of a measurement surface, the measurement surface being a tread surface or a sidewall surface of a tire having a projection formed thereon, the measuring device comprising:
a measuring unit that performs a measurement process a plurality of times while shifting a spotlight emitted from a light source in a sub-scanning direction on a reference tire, and acquires a plurality of pieces of measurement data, the measurement process including illuminating the measurement surface with the spotlight, scanning the measurement surface in a main-scanning direction with the spotlight, receiving reflected light, and acquiring measurement data for one line; and a processor, wherein the measuring unit includes:
  a rotating unit that rotates the tire about a center axis of the tire;
  a spot light source that emits the spot light to illuminate the measurement surface of the rotated tire, thereby allowing the measurement surface to be scanned in a main-scanning direction with the spotlight; and
  a camera that receives reflected light from the measurement surface, performs the measurement process the plurality of times while shifting the spotlight in the sub-scanning direction, and acquires the plurality of pieces of measurement data, the processor includes:
a first acquisition unit that generates pieces of one-dimensional height data respectively from the plurality of pieces of measurement data, arranges the plurality of generated pieces of one-dimensional height data, and acquires two-dimensional height data of the measurement surface; and
a generation unit that extracts a boundary of the projection from the two-dimensional height data using an edge detection filter, extracts a region surrounded by the extracted boundary as the projection, associates a position of the extracted projection with the two-dimensional height data, and generates reference form data,
the generation unit calculates an average or a median of height data at each position in a background region other than the projection as a reference value of the background region from height data at each position of the two-dimensional height data, generates a height component at each position in the projection by subtracting the reference value from height data at each position in the projection, and associates the generated height component with the two-dimensional height data,
the measuring unit performs the measurement process on the measurement surface of a target tire, which is a measurement object, and acquires the measurement data for one line,
the processor further including:
a second acquisition unit that generates one-dimensional height data using the measurement data acquired in the measuring unit; and
a removal unit that compares target one-dimensional height data, which is the one-dimensional height data acquired in the second acquisition unit, with one-dimensional height data in the reference form data, a corresponding position of which in the sub-scanning direction is the same as the target one-dimensional height data, and removes a height component of the projection from the target one-dimensional height data, wherein
the removal unit identifies a region of the projection in the target one-dimensional height data using one-dimensional height data in the reference form data, a corresponding position of which in the sub-scanning direction is the same as the target one-dimensional height data, and subtracts the height component from the height data at each position in the identified region of the projection to thereby exclude the projection from the target one-dimensional height data.

* * * * *